Dec. 6, 1966     D. M. DAWSON     3,290,080

BREAKABLE SEAL

Filed Dec. 2, 1964

*INVENTOR.*
DOUGLAS M. DAWSON
BY
*Lloyd J. Andres*

United States Patent Office 3,290,080
Patented Dec. 6, 1966

3,290,080
BREAKABLE SEAL
Douglas M. Dawson, Miami Springs, Fla., assignor to Industrial Plastic Molders, Inc., Hialeah, Fla., a corporation of Florida
Filed Dec. 2, 1964, Ser. No. 415,530
1 Claim. (Cl. 292—322)

This invention relates in general to disposable seals and more particularly to a molded plastic seal which may be manufactured at very low cost and applied with simple tools.

Seals prior to this invention of the type used for sealing railroad boxcars, water, gas and power meters, odometers, readout devices and other closures where entry is unlawful, comprised an assembly of parts usually in the form of a metal body, a wire loop and a deformable lead anchor, which seals are relatively expensive and require special tools for their application and are subject to rust or corrosion. Furthermore, certain prior types of security seals are not tamper-proof and may be opened and re-sealed without obvious detection.

The present invention overcomes the above objections and disadvantages by the provision of a one piece plastic molding, highly resistant to corrosion, which inherently provides space for identification and provides a high degree of security against tampering and is subject to quantity manufacture at very low cost, which construction thereof is a principal feature of the invention.

A further object of the invention is the provision of a disposable seal molded from plastic material plasticized to predetermined resilience forming a padlock-like closure resistant to forceful opening without obvious visible fracture.

Another object of the invention is the provision of a disposable seal molded from resilient plastic material having a body with a resilient shaft with one end thereof integral therewith and the opposite end portion thereof adapted to securely engage in a predetermined bore in the body with the shaft forming a closed loop.

Another object of the invention is the provision of a seal made from plastic material of predetermined flexibility and having a body and an integral shaft extending therefrom with the outer portion thereof including a plurality of projections adapted to be engaged and secured in mating recesses in a bore in the body.

Figure 1:
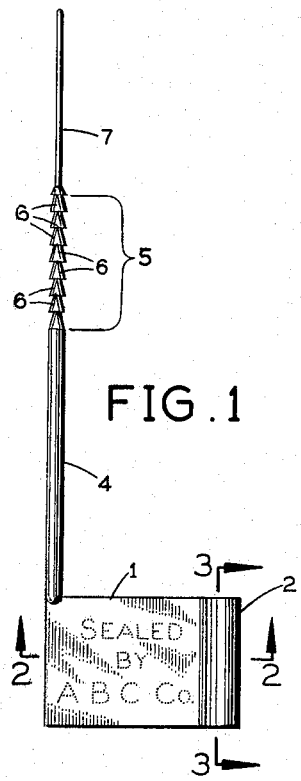
Figure 2:
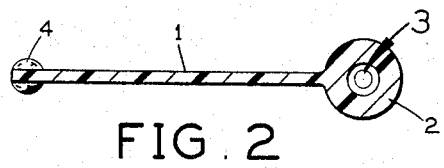
Figure 3:
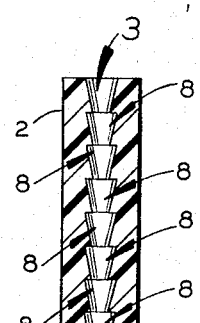
Figure 4:
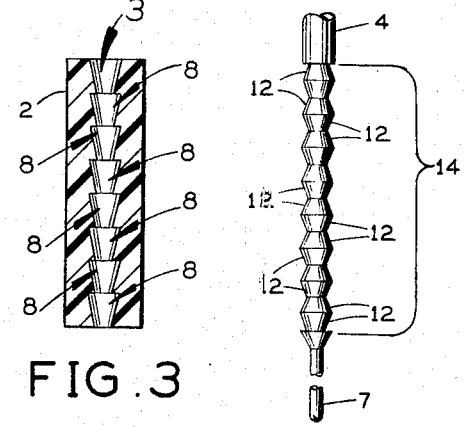
Figure 6:
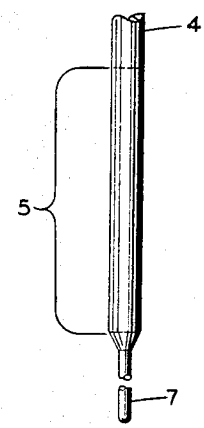
Figure 5:
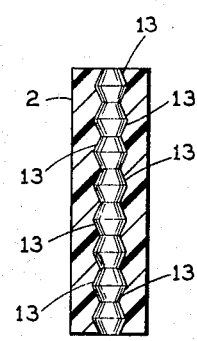
Figure 7:
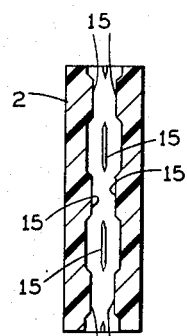
Figure 8:
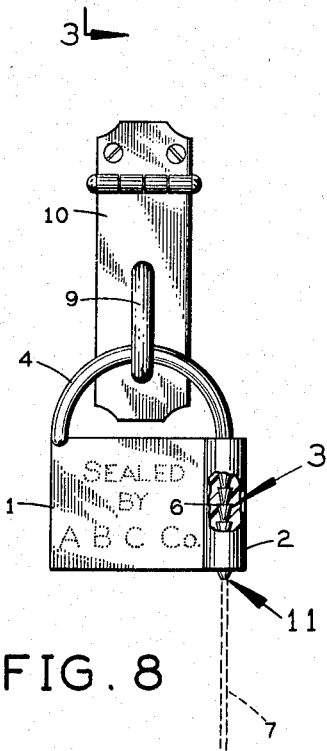

These and other objects and advantages in one embodiment of the invention are described and shown in the following specification and drawing, in which:

FIG. 1 is a side elevation of the seal.
FIG. 2 is a cross sectional view taken through section line 2—2, FIG. 1.
FIG. 3 is a cross sectional view taken through section line 3—3, FIG. 1.
FIGS. 4 and 5 show alternate forms of locking means on the shaft and bore of the seal, shown in FIG. 1.
FIGS. 6 and 7 show another form of locking means applied to the shaft and bore shown in FIG. 1.
FIG. 8 is a side elevation of the seal shown in FIG. 1 in closed position.

Referring to FIG. 1, a thin wafer like body member 1 is molded of plastic material integral with a cylindrical portion 2, which has a coaxial bore 3 therethrough. A cylindrical shaft 4 is also integral with body member 1, as shown, with an outer lock portion 5 thereof including a plurality of linear barbs 6 with a tab portion 7 of smaller diameter extending a predetermined distance beyond the outermost one of the barbs.

The bore 3 is provided with a plurality of conical linear cavities 8 corresponding with the barbs 8 on the lock portion 5.

Although many plastic materials may be used for injection molding the above described seal in a multi-cavity mold, preferred materials are polyethylene, and polypropylene because of their inherent toughness, flexibility and resistance to bonding by adhesives. The latter property prohibits non-detectable resealing following un-authorized opening.

Certain pertinent nomenclature may be molded in the body portion, as illustrated.

In operation and referring to FIG. 8, the tab 7, the lock portion 5 and a part of shaft 4 is threaded through the staple 9 of a hasp 10, or equivalent closure means; then the tab is projected through the bore 3 by manual means. The body 1 and the tab 7 are then preferably gripped by ordinary pincers and the lock portion of shaft 4 pulled through the bore 3 by tab 7 until the barbs 6 engage the mating cavities 8, which sequential engagement is made by virtue of the limited resilience of both the barb portion 5 and the cylindrical portion 3. It is now apparent that the reverse unlocking movement of the shaft 4 will resist a force in excess of that required to break the shaft. In practice, it is customary to shear the tab 7 from the shaft at point 11 as added security to prevent reinsertion of the lock portion of the shaft into bore 3 in the event of its removal.

Although the barbs 6, when seated within cavities 8 form a satisfactory lock against counter movement of the shaft 4, other forms of engaging means have certain advantages.

For example, in the alternate construction shown in FIGS. 4 and 5, the portion 14 is formed as dual cones 12 engaged with like cavities 13 in the bore of portion 2, which is satisfactory from a holding standpoint, but under certain limited resilience of the plastic material, the core forming the cavities 13 when molded may be withdrawn with less force than that required for forming the cavities 8, shown in FIG. 3.

FIG. 6 shows an alternate form of shaft 4, in which the outer portion 5 thereof is a plain continuation of the cylindrical shaft, and FIG. 7 illustrates another form of a mating cylindrical bore in portion 2, which is lesser in diameter than the shaft portion 10 and includes a plurality of projections extending inward thereof. When portion 5 is forcibly drawn into the bore by tab 7 the projections 15 are self engaged in the outer surface of portion 5 when the parts are permitted to relax to normal shape and size.

Another satisfactory form comprehends a plain non-barbed shaft 4 adapted to be drawn into a plain undersized cylindrical bore in portion 2 which in effect enlarges the diameter of the bore and reduces the diameter of the portion 5 under the tension applied to tab 7. When the tension is relieved from the tab, the portion 5 will firmly engage the bore 3 with high friction and prevent a satisfactory seal. It is also apparent that in the event the shaft is forcibly removed from the bore, it will be difficult, if not impossible, reinsert the portion 5 into the bore without the aid of tab 7.

It is understood that certain modifications in the construction, utilizing the features above described, are intended to come within the scope of the appended claim.

Having described my invention, I claim:

In a seal of the character described a body member having parallel opposite sides,
a lock portion integral with and along one edge of said body member,
said lock portion having a central bore therethrough,
a flexible shaft having one end thereof integral with said body member with the outer end portion thereof adapted and constructed for locking engagement with said lock portion within said bore, a tab having one end integral with and colinear to the opposite end of said shaft and having a diameter less than the said end portion, the said end portion in the form of a shaft of uniform circular cross section and said bore having a circular cross section with a diameter less than that of said end portion, a bore in said body having projections axially extending along the wall integral therewith for indenting said end portion when the latter is engaged in said bore whereby said shaft will form a closed sealing loop when said tab is threaded through said bore and the outer end portion is drawn into said bore by said tab.

References Cited by the Examiner

UNITED STATES PATENTS

| | | | |
|---|---|---|---|
| 1,979,508 | 11/1934 | Van Den Bel | 24—30.5 |
| 2,545,428 | 3/1951 | Liautaud | 24—30.5 X |
| 3,009,220 | 11/1961 | Fein | 24—16 |
| 3,086,265 | 4/1963 | Orenick et al. | 24—30.5 |
| 3,146,012 | 8/1964 | King | 292—320 |
| 3,147,522 | 9/1964 | Schumm | 24—16 |
| 3,186,047 | 6/1965 | Schwester et al. | 24—16 |
| 3,251,260 | 5/1966 | Serdechny | 24—216 X |

EDWARD C. ALLEN, *Primary Examiner.*

RICHARD E. MOORE, *Examiner.*